Oct. 6, 1970 S. P. KOVELL ETAL 3,532,568
METHOD FOR ETCHING COPPER
Filed Nov. 24, 1967
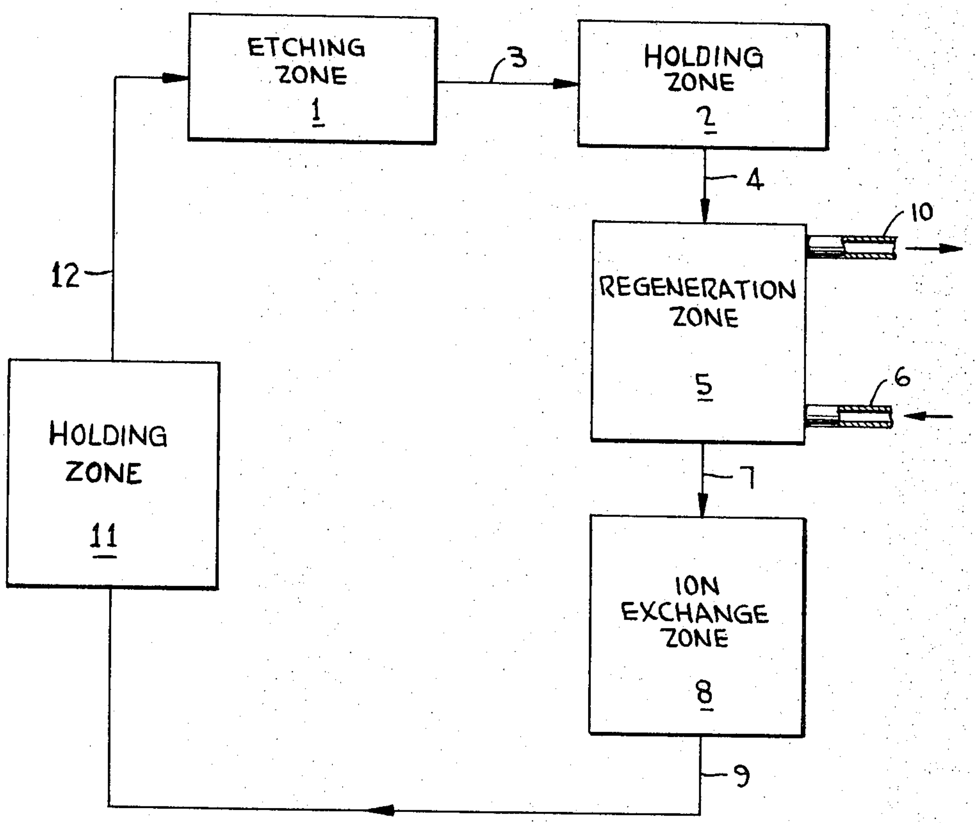
INVENTORS,
JOHN B. SCHUTT
STANLEY P. KOVELL
BY
ATTORNEYS United States Patent Office 3,532,568

Patented Oct. 6, 1970

3,532,568

METHOD FOR ETCHING COPPER

Stanley P. Kovell, Annandale, Va., and John B. Schutt, Silver Spring, Md., assignors to the United States of America as represented by the Administrator of the National Aeronautics and Space Administration Filed Nov. 24, 1967, Ser. No. 685,473
Int. Cl. B44c *1/22;* C23f *1/00*
U.S. Cl. 156—3 4 Claims

ABSTRACT OF THE DISCLOSURE

Copper is etched from a surface by contacting the surface with an acidic solution of ferric ion which is reduced to the ferrous valence state. Substantial concentration of ferric ion is maintained in the solution by oxidizing ferrous ion produced during the etching with oxygen in the presence of ultraviolet light.

The invention herein described was made by employees of the United States Government and may be manufactured and used by or for the Government for governmental purposes without the payment of any royalties thereon or therefor.

This invention relates to a method for etching a metal from a surface by contacting the surface with an acidic solution of a metal ion in a first valence state which is reduced to a lower valence state while maintaining a substantial concentration of the metal ion at a first valence in the solution by contacting the metal ion of lower valence state with oxygen in the presence of ultraviolet light.

More particularly, the invention relates to a method for etching copper from a surface such as the surface of a printed circuit board by contacting the surface with an acidic solution of ferric ion which is reduced to ferrous ion while maintaining a substantial concentration of ferric ion in the solution by contacting the ferrous ion with oxygen in the presence of ultraviolet light .

Etching techniques known to the art have several deficiencies. Recovering metal etched from a surface having the metal thereon, disposing of spent etchant, waiting for the return of etchant sent to a manufacturer for regeneration or disposal thereof and controlling etching rate and quality are among the problems presented by previously known processes.

Accordingly, it is an object of this invention to control the rate and quality of a metal etching process.

Another object of the invention is to maintain a desired concentration of metallic etchant during an etching process.

Another object is to recover quantitatively metal etched from a surface having the metal thereon.

Another object is to etch metal from a surface with an acidic solution of a metallic oxidizing agent while simultaneously regenerating the oxidizing agent with oxygen in the presence of ultraviolet light.

The invention provides a method for etching metal from a surface by contacting the metal surface with a solution of a metallic ion at a first valence which is reduced to an ion of lower valence state, and maintaining a substantial concentration of the metallic ion in the first valence state in the solution by contacting the ion of lower valence state with oxygen in the presence of ultraviolet light. Generally, the etching solution also contains an aqueous acid such as a mineral acid; for example, HCl and $H_2SO_4$ can be used.

The concept of this invention is particularly applicable to the etching of copper from a surface by contacting the surface with an acidic solution of a ferric ion, usually present as a salt such as ferric chloride. As copper is removed from the surface, the ferric ion is reduced to ferrous ion while copper metal is oxidized to cupric ion. To permit recovery of the cupric ion and to convert ferrous ion to ferric, the ferrous ion is contacted with oxygen in the presence of ultraviolet light. Ferrous ion is converted to ferric; cupric ion can then be recovered by contacting same with an ion exchange resin.

The formation of cupric ion during etching of a copper surface by a ferric ion etchant in the presence of an acid proceeds as follows:

$$2Fe^{+3} + Cu^{\circ} \xrightarrow{\text{acid}} 2Fe^{+2} + Cu^{+2}$$

Ferric ion is regenerated in the presence of oxygen, a mineral acid, e.g. hydrochloric acid, and ultraviolet light, as follows:

$$2Fe^{+2} + \tfrac{1}{2}O_2 + 2H^{+} \xrightarrow[\text{light}]{\text{ultraviolet}} 2Fe^{+3} + H_2O$$

The drawing attached to the specification illustrates schematically the method of the invention.

Referring more particularly to the drawing, printed circuit boards having a metal such as copper on at least one surface thereof are inserted in etching zone 1 which contains a metal ion at a first valence such as ferric ion in acidic solution. The ferric ion acts as an oxidizing agent for the copper which is etched from the surface to form cupric ion while ferric ion is reduced to ferrous ion, an ion of lower valence state than ferric ion.

As initial ferric ion concentration declines, and continuously thereafter, a portion of the etching solution is passed from etching zone 1 to first holding zone 2 via line 3. In holding zone 2, the etching solution is stored for a predetermined time to allow flow control.

The etching solution containing ferrous ions passes from holding zone 2 via line 4 to wetted transparent surface regeneration zone 5, which is surrounded by ultraviolet light sources (not shown). Preferably, the etching solution will flow in a thin film over the transparent surface of regeneration zone 5. An oxygen containing gas such as air flows continuously into zone 5 via line 6, and exits from zone 5 via line 10. As a result of simultaneous contacting with oxygen and ultraviolet radiation in zone 5, ferrous ion is oxidized to ferric ion in accordance with the formula disclosed above.

The solution passing from zone 5 to ion exchange zone 8 via line 7 contains a substantial concentration of a ferric anion complex containing ferric ion and chloride ion. As the solution passes through zone 8, which contains an ion exchange resin in the acid form such as a sulfonated styrene-divinylbenzene copolymer, most of the copper in the solution is adsorbed by the resin, while most of the ferric anion complex passses through the zone and is returned to zone 1 after first being passed to a second holding zone 11. Connecting ion exchange zone 8 and etching zone 1 with second holding zone 11 are lines 9 and 12 respectively. In ion exchange zone 8, copper is periodically recovered from the resin by washing same with hydrochloric acid; washing simultaneously regenerates the adsorptive capacity of the resin.

Any iron adsorbed by the ion exchange resin during the passage therethrough of the regenerated etching solution can be recovered from the resin by washing same with an acid solution having a pH no greater than 2.5.

Additional hydrochloric acid is added to the etching solution periodically to maintain the pH thereof below 7, and, preferably, between 1.0 and 2.5. The etching solution is maintained at saturation concentration with respect to ferric chloride by the continuous regeneration of ferric ion by the process of this invention.

While not shown, additional etching solution can be periodically added to the system to make up for leakage and other losses.

Although the process of this invention is described with reference to a preferred embodiment thereof, it should be understood that the scope of the invention is limited only by the appended claims.

We claim:

1. A method of etching copper from a surface having said copper thereon comprising contacting said copper with ferric ion in an aqueous acidic solution, whereby ferric ion is reduced to ferrous ion, and maintaining a substantial concentration of said ferric ion in said solution by contacting said ferrous ion with oxygen in the presence of ultraviolet light.

2. The method of claim 1 wherein cupric ion formed by etching said copper from said surface is recovered by adsorption on the surface of an ion exchange resin in acid form.

3. The method of claim 2 wherein said solution contains sufficient chloride ion to form a ferric anion complex with substantially all ferric ion produced by contacting said ferrous ion with oxygen in the presence of ultraviolet light.

4. The method of claim 1 wherein said acidic solution contains hydrochloric acid.

References Cited

UNITED STATES PATENTS

| | | | |
|---|---|---|---|
| 2,908,557 | 10/1959 | Black et al. | |
| 3,083,129 | 3/1963 | Jones et al. | 156—19 |
| 3,116,240 | 12/1963 | Downey et al. | |

ROBERT F. BURNETT, Primary Examiner

W. A. POWELL, Assistant Examiner

U.S. Cl. X.R.

156—7, 19